(No Model.)
P. E. SHEE.
CUTTER BAR FOR MOWERS AND REAPERS.
No. 380,058. Patented Mar. 27, 1888.
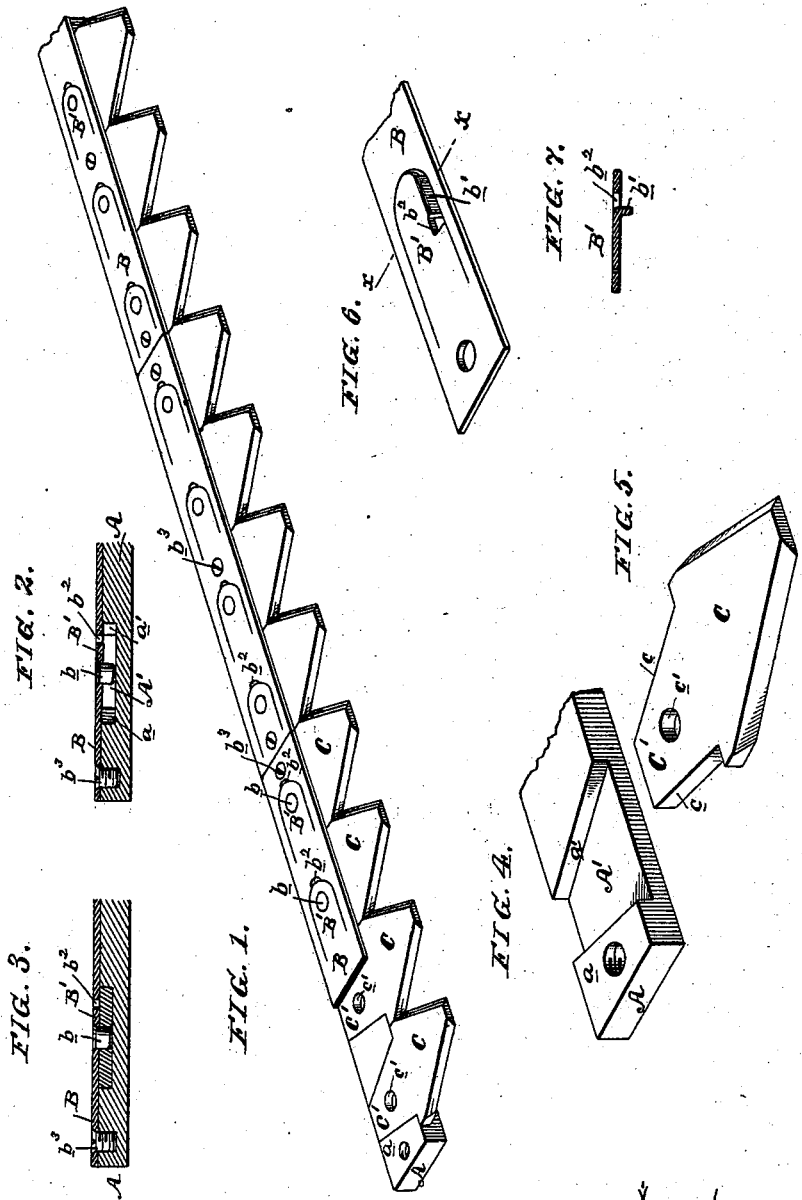
Attest:
Isaac Norris 3rd
Joshua Matlack, Jr.
Inventor:
Parke E. Shee,
by his attorney
Francis T. Chambers

United States Patent Office.

PARKE E. SHEE, OF CHESTER, ASSIGNOR TO HIMSELF, AND ROBERT W. MARTIN, OF PHILADELPHIA, PENNSYLVANIA.

CUTTER-BAR FOR MOWERS AND REAPERS.

SPECIFICATION forming part of Letters Patent No. 380,058, dated March 27, 1888.

Application filed November 1, 1887. Serial No. 253,961. (No model.)

*To all whom it may concern:*

Be it known that I, PARKE E. SHEE, of Chester, county of Delaware, State of Pennsylvania, have invented a new and useful Improvement in Cutter-Bars for Mowers and Reapers, of which the following is a true and exact description, reference being had to the accompanying drawings, which form a part of this specification.

My invention relates to the construction of mowing and reaping machine cutter-bars of the kind in which the cutters are independently removable, and my object is to render the cutters more easily removable, to simplify and cheapen the construction of such bars, and especially to so arrange the devices which hold the removable cutters in place that the weight of the bar shall not be materially increased, reference being now had to the drawings which illustrate my invention, Figure 1 is a perspective view of a portion of a cutter-bar constructed in accordance with my improvement. Fig. 2 is a sectional view of a portion of the bar, taken on a line passing through the center of the bar and parallel to its length. Fig. 3 is a similar view to Fig. 2, except that the cutter is shown in place, the section passing through its shank. Fig. 4 is a perspective view of a portion of the main bar, showing the formation of the socket in which the removable cutters are inserted. Fig. 5 is a perspective view of one of the removable cutters. Fig. 6 is a perspective view of the plate constituting the upper portion of the cutter-bar, showing a slightly-modified device for holding the cutters in place; and Fig. 7 is a cross-section of the device shown in Fig. 6, taken on the line $x\ x$.

A is the lower and main portion of the cutter-bar. A′ is a socket cut in this bar A, the edges $a'\ a'$ of which flare outward, as shown.

$a$ is a rivet or screw hole.

B B, &c., are thin plates of some elastic metal, preferably of steel. These plates are secured to the top of bar A by screws or rivets $b^3$, which enter the holes $a'$ in bar A. These plates or bars pass over and form the top of the sockets A′, and spring-tongues B′ are cut or stamped in the bars B, so that their free ends shall be over the sockets A′. In each of these spring-tongues B′ a downwardly-projecting detent, $b$ or $b'$, is secured in the tongue B, as in Fig. 2, or formed by bending down a portion of the tongue itself, as shown in Figs. 6 and 7. A small opening, $b^2$, between the tongue B′ and plate B should in all cases be formed for the entrance of a pointed tool to lift the spring. This may be done by cutting away a small portion of the plate, as shown in Figs. 2 and 3, or by cutting away a small portion of the tongue, as shown in Fig. 6.

C C, &c., are the removable cutters. They are each provided with shanks C′, which are tapered and formed to fit neatly in the sockets A′, their edges $c\ c$ having of course the same inclination as the edges $a\ a$ of the socket. In the shanks C′ a hole or opening, $c'$, is formed in such a position as to come directly beneath the latch $b$ or $b'$ when the shank is fitted into the socket.

I prefer to make the plates B in sections, as shown, for the reason that when so made any defect or breakage in a spring or latch would necessitate the removal of only a short section, while if the bar B were continuous, running the whole length of the bar A, it would both be more difficult and more expensive to renew a broken part. The manufacture of the plates or bars B is also, of course, simplified by making them in short sections.

My plan of forming the spring-tongues B′ in the bars B greatly simplifies the construction of the apparatus and leaves the bars smooth and free from projections.

The object of making the socket A′ of the bar and the shanks C′ of the cutters of the tapering form shown and described is to facilitate the removal of the cutters, and thus avoid the trouble heretofore found with sockets having parallel sides, in which rust would bind the cutters so tightly in their sockets as to render it difficult to remove them. By the construction shown this difficulty is of course entirely overcome.

Having now described my invention, what I claim as new, and desire to secure by Letters Patent, is—

1. In a cutter-bar for mowing-machines, the combination of a bar having sockets cut therein for the reception of independently-removable cutters, a light bar secured to the first bar so as to cover and form the top of the sockets, springs formed over the sockets by cutting or punching out tongues of metal from the light bar, and detents on the inside of said spring-tongues, all substantially as and for the purpose specified.

2. In a cutter-bar for mowing-machines, the combination of a bar having sockets cut therein and tapered from front to back of the bar for the reception of independently-removable cutters having correspondingly-tapered shanks, a light bar secured to the first bar so as to cover and form the top of the sockets, springs formed over the sockets by cutting or punching out tongues of metal from the light bar, and detents on the inside of said spring-tongues, all substantially as and for the purpose specified.

3. In a cutter-bar for mowing-machines, the combination of a bar having sockets cut therein for the reception of independently-removable cutters, a light bar secured to the first bar so as to cover and form the top of the sockets, springs formed over the sockets by cutting or punching out tongues of metal from the light bar, detents on the inside of said spring-tongues, and cutters having shanks formed to fit into said sockets, and having holes formed to register with and engage the detents on the spring-tongues when the cutter is in place, all substantially as and for the purpose specified.

4. In a cutter-bar for mowing-machines, the combination of a bar having sockets cut therein and tapered from front to back of the bar for the reception of independently-removable cutters, a light bar secured to the first bar so as to cover and form the top of the sockets, springs formed over the sockets by cutting or punching out tongues of metal from the light bar, detents on the inside of said spring-tongues, and cutters having tapered shanks formed to fit into said sockets, and having holes formed to register with and engage the detents on the spring-tongues when the cutter is in place, all substantially as and for the purpose specified.

PARKE E. SHEE.

Witnesses:
FRANK A. MULLIKIN,
JOSHUA MATLACK, Jr.